United States Patent
Kim et al.

(10) Patent No.: US 9,977,280 B2
(45) Date of Patent: May 22, 2018

(54) COT TYPE LIQUID CRYSTAL DISPLAY DEVICE

(71) Applicant: LG Display Co., Ltd., Seoul (KR)

(72) Inventors: Tae-Young Kim, Paju-si (KR); Woo-Jung Byun, Paju-si (KR); Sang-Ho Lee, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 14/540,125

(22) Filed: Nov. 13, 2014

(65) Prior Publication Data
US 2015/0185551 A1 Jul. 2, 2015

(30) Foreign Application Priority Data

Dec. 31, 2013 (KR) .................. 10-2013-0168767

(51) Int. Cl.
*G02F 1/1335* (2006.01)
*G02F 1/1339* (2006.01)
*G02F 1/1362* (2006.01)

(52) U.S. Cl.
CPC .... *G02F 1/133514* (2013.01); *G02F 1/13394* (2013.01); *G02F 2001/136222* (2013.01); *G02F 2201/48* (2013.01)

(58) Field of Classification Search
USPC ................... 349/106, 110, 155, 156
See application file for complete search history.

(56) References Cited

U.S. PATENT DOCUMENTS

| | | | | |
|---|---|---|---|---|
| 5,641,974 A | * | 6/1997 | den Boer | G02F 1/136213 257/59 |
| 7,227,185 B2 | * | 6/2007 | Lin | G02F 1/136209 257/257 |
| 7,542,112 B2 | * | 6/2009 | Rhee | G02F 1/1362 349/106 |
| 8,138,500 B2 | * | 3/2012 | Hosoya | G02F 1/136213 257/59 |
| 8,724,057 B2 | * | 5/2014 | Tseng | G02F 1/136209 349/106 |
| 2004/0125277 A1 | * | 7/2004 | Kim et al. | 349/106 |
| 2005/0117092 A1 | * | 6/2005 | Park | G02F 1/133514 349/106 |
| 2006/0290872 A1 | * | 12/2006 | Morii | G02F 1/133514 349/156 |
| 2008/0068537 A1 | * | 3/2008 | Lee | G02F 1/136209 349/106 |
| 2008/0259255 A1 | * | 10/2008 | Chae | G02F 1/13394 349/106 |

(Continued)

FOREIGN PATENT DOCUMENTS

CN 1621917 A 6/2005
TW 309327 B 5/2009

*Primary Examiner* — Edward Glick
*Assistant Examiner* — David Chung
(74) *Attorney, Agent, or Firm* — Dentons US LLP

(57) ABSTRACT

Disclosed is a color filter on transistor (COT) type liquid crystal display device that may include red, green, blue and white pixels on a substrate; red, green and blue color filters in the red green and blue pixels, respectively, and a white pattern in the white pixel; a planarization layer on the red, green and blue color filters; and a column spacer on the planarization layer, wherein the column spacer and the white pattern are made of the substantially same material.

12 Claims, 8 Drawing Sheets

(56) References Cited

U.S. PATENT DOCUMENTS

| | | | |
|---|---|---|---|
| 2009/0194780 A1* | 8/2009 | Kwon | H01L 27/3246 257/98 |
| 2010/0085515 A1* | 4/2010 | Kim et al. | 349/106 |
| 2010/0118254 A1* | 5/2010 | Hashimoto | 349/155 |
| 2010/0123860 A1* | 5/2010 | Kim | G02F 1/133516 349/106 |
| 2012/0262653 A1* | 10/2012 | Shimizu et al. | 349/106 |

* cited by examiner

COT TYPE LIQUID CRYSTAL DISPLAY DEVICE

This application claims the benefit of Korean Patent Application No. 10-2013-0168767, filed on Dec. 31, 2013, which is hereby incorporated by reference for all purposes as if fully set forth herein.

BACKGROUND OF THE INVENTION

Field of the Disclosure

The present invention relates to a liquid crystal display device (LCD), and more particularly, to a color filter on transistor (COT) type LCD and method of manufacturing the same.

Discussion of the Related Art

Liquid crystal display devices (LCDs), which are advantageous in displaying moving images, have high contrast ratio and thus have been actively used for TVs or monitors. LCDs display images using optical anisotropy and polarization of liquid crystal.

An LCD uses a liquid crystal panel as a main component, which includes upper and lower substrates facing each other with a liquid crystal layer therebetween. Difference in transmittance is realized by changing alignment direction of liquid crystal molecules according to an electric field induced in the liquid crystal panel.

Recently, a color filter on transistor (COT) type LCD, which has both thin film transistors (TFTs) and color filters on the same substrate, has been used due to its advantage of reducing an alignment margin of the upper and lower substrates, which can thus increase the aperture ratio.

A COT-type LCD according to the related art includes a first substrate on which TFTs, color filters, pixel electrodes and a first alignment layer are formed, a second substrate coupled to the first substrate using a sealant on which common electrodes and a second alignment layer are formed, a liquid crystal layer between the first and second substrates, and black column spacers for maintaining a gap between the first and second substrates.

The COT-type LCD may include four color filters i.e., red, green, blue and white color filters in order to increase transmittance.

However, because the COT-type LCD has the white color filter, the number of mask processes to manufacture the COT-type LCD increases. Accordingly, the number of production processes increases, production cost increases, and thus productivity is reduced. Further, there is a problem in that the black resin used for the black column spacer is expensive.

SUMMARY OF THE INVENTION

Accordingly, the present invention is directed to a color filter on transistor (COT) type liquid crystal display device (LCD) and method of manufacturing the same that substantially obviates one or more of the problems due to limitations and disadvantages of the related art.

An advantage of the present invention is to provide a COT-type LCD that can reduce production cost and improve productivity.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a color filter on transistor (COT) type liquid crystal display device may, for example, include red, green, blue and white pixels on a substrate; red, green and blue color filters in the red green and blue pixels, respectively, and a white pattern in the white pixel; a planarization layer on the red, green and blue color filters; and a column spacer on the planarization layer, wherein the column spacer and the white pattern are made of the substantially same material.

In another aspect, a method of manufacturing a color filter on transistor (COT) type liquid crystal display device may, for example, include forming a thin film transistor on a first substrate, the thin film transistor including a gate electrode, an active layer and source and drain electrodes; forming a passivation layer on the thin film transistor; forming red, green and blue color filters on the passivation layer in respective pixel regions; forming a planarization layer on the red, green and blue color filters; forming a white pattern hole in the planarization layer; coating an organic material over the substrate having the planarization layer including the white pattern hole; forming a column spacer and a white pattern by patterning the organic material; and forming a pixel electrode electrically connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 1:
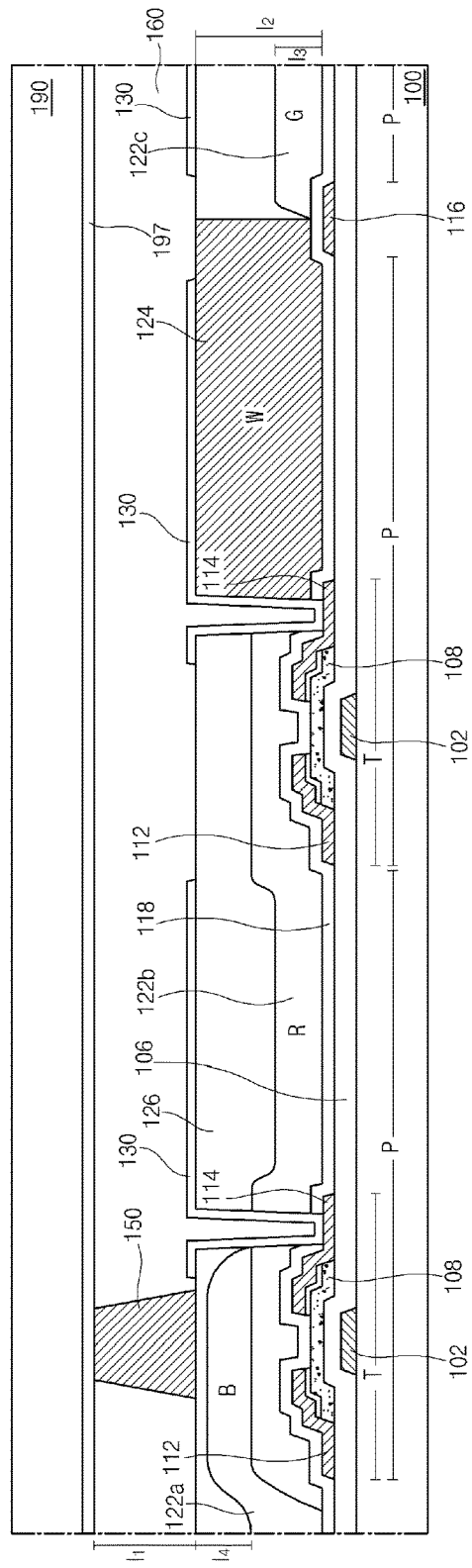
FIG. 1 is a cross-sectional view illustrating a color filter on transistor (COT) type liquid crystal display device (LCD) according to an embodiment of the present invention.

FIG. 1 is a cross-sectional view illustrating a color filter on transistor (COT) type liquid crystal display device (LCD) according to an embodiment of the present invention.

Referring to FIG. 1, the COT-type LCD includes a first substrate 100 on which a TFT T and a color filter layer on the TFT are formed, a second substrate 190 on which a common electrode 197 is formed, and a liquid crystal layer 160 between the first and second substrates 100 and 190.

A plurality of gate lines (not shown) and a plurality of data lines 116 are formed to define a plurality of pixel regions P on an inner surface of the first substrate 100, and the TFT T is formed near the crossing portion of the gate line and the data line 116. The TFT T includes a gate electrode 102, a semiconductor layer 108, and source and drain electrodes 112 and 114.

A gate insulating layer 106 is formed on the gate electrode 102 and the gate line. A passivation layer 118 is formed on the TFT T to protect the TFT T.

Color filter patterns are formed in the respective pixel regions P. In other words, blue (B), red (R), green (G) and white (W) color filter patterns 122a, 122b, 122c and 124 are formed in the respective pixel regions P. The white color filter pattern 124 is referred to as a white pattern.

The white pattern 124 may be formed at the same layer as the blue, red and green color filter patterns 122a, 122b and 122c. The white pattern 124, which emits a white light, is used to improve the transmittance the COT-type LCD.

The blue, red and green color filter patterns 122a, 122b, 122c and the white pattern 124 may be arranged in a stripe type along a column direction.

At least two color filter patterns are stacked on the TFT T to shield the semiconductor layer 108 from light. In other words, the at least two color filter patterns on the TFT T function as a black matrix to reduce or prevent degradation the TFT T due to the light entering the semiconductor layer 108.

A planarization layer 126 is formed on the blue, red and green color filter patterns 122a, 122b and 122c to planarize surfaces over the blue, red and green color filter patterns 122a, 122b and 122c.

A pixel electrode 130 is formed on the planarization layer 126 or the white pattern 124 in each pixel region P and is electrically connected to the drain electrode 114.

The white pattern 124 has its top surface at substantially the same level as a top surface of the planarization layer 126. In other words, the white pattern 124 and the planarization layer 126 have the substantially same height from the first substrate 100.

A column spacer 150 is formed over the TFT T to maintain a cell gap between the first and second substrates 100 and 190.

The column spacer 150 may be formed of the same material as the white pattern 124, and in the same process of forming the white pattern 124. For example, the column spacer 150 and the white pattern 124 may be made of an organic material including acryl resin that is transparent.

Because the column spacer 150 and the white pattern 124 are formed in the same process, a number of mask processes can be reduced in manufacturing a COT-type LCD according to an embodiment of the present invention.

The column spacer 150 and the white pattern 124 may be photosensitive, and the can be patterned through light exposure.

The column spacer 150 has a first thickness 11 to maintain a cell gap between the first and second substrates 100 and 190. The first thickness 11 may be about 3 μm or less, for example, 2.4 μm.

The white pattern 124 has a second thickness 12, which is substantially equal to a total thickness of the planarization layer 126 and the blue, red or green color filter 122a, 122b or 122c below the planarization layer 126, to maintain the cell gap. The second thickness 12 may be about 4 μm or less, for example, 3.7 μm.

Each of the blue, red and green color filters 122a, 122b and 122c in the respective pixel regions P may have a third thickness 13 of 3 μm or less, for example, 2.3 μm.

An upper layer out of the at least two layers overlapping each other on the TFT T to shield the semiconductor layer 108 has a fourth thickness 14. The fourth thickness 14 is about 2 μm or less, for example, 1.4 μm.

As described above, the column spacer 150 and the white pattern 124 are formed in the same process i.e., the same mask process, thus a number of mask processes can be reduced and productivity can be improved.

Further, because the column spacer 150 may be made of the same material as the white pattern 124, which is relatively inexpensive, production cost can also be reduced compared with the LCD according to the related art, which uses an expensive black column spacer.

A method of manufacturing a COT-type LCD according to an embodiment of the present invention is now be described with reference to FIGS. 2A to 2G.

FIGS. 2A to 2G are cross-sectional views illustrating a method of manufacturing a COT-type LCD according to an embodiment of the present invention. For brevity, the green color filter formed in the same manner as the blue and red color filters is omitted.

Figure 2A:
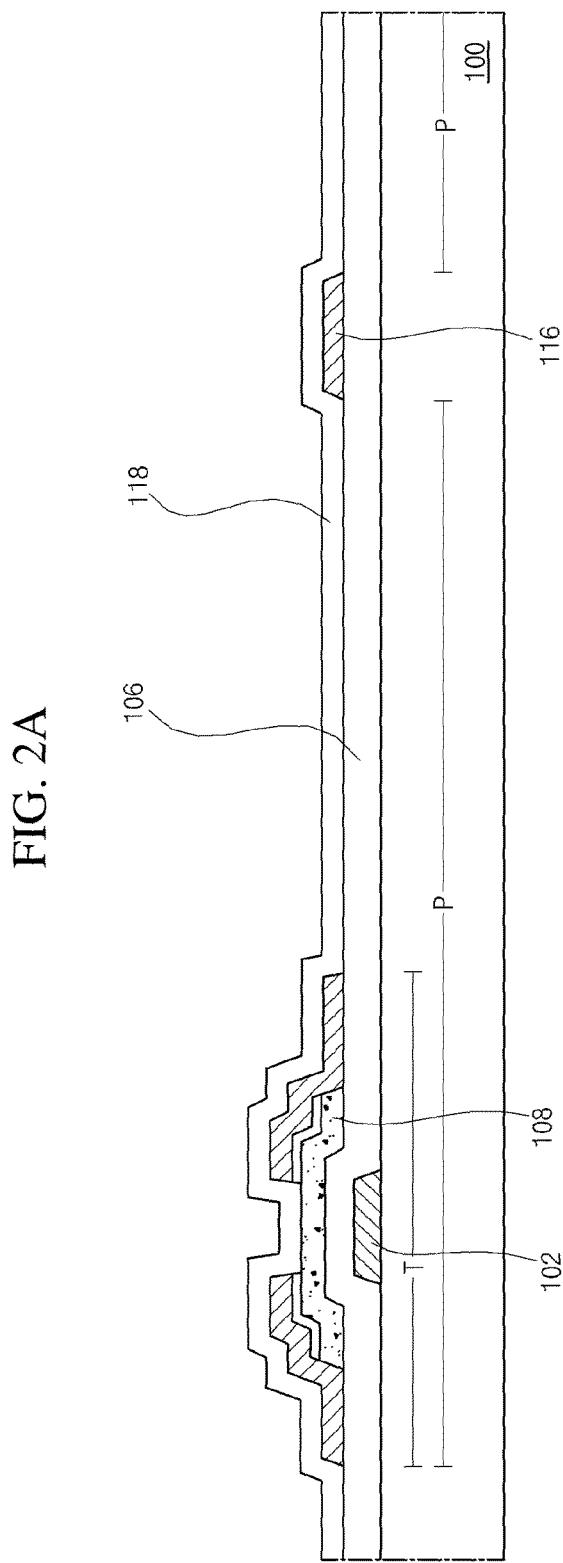
FIGS. 2A to 2G are cross-sectional views illustrating a method of manufacturing a COT-type LCD according to an embodiment of the present invention.

Referring to FIG. 2A, the TFT T, the gate line, and the data line 116 are formed on the first substrate 100. The TFT T includes the gate electrode 102, the semiconductor layer 108, and the source and drain electrodes 112 and 114.

The gate electrode 102 and the gate line may be formed by depositing a conductive material having low resistance and being opaque such as Al, Al alloy, W, Cu, Ni, Cr, Mo, Ti, Pt or Ta, or a transparent conductive material such as ITO or IZO on the first substrate 100 and then patterning the deposited material in a mask process.

Then, the gate insulating layer 106 is formed on the gate electrode 102 and the gate line. The semiconductor layer 108, and the source and drain electrodes 112 and 114 are formed on the gate insulating layer 106. The data line 116 is formed in the same process of forming the source and drain electrodes 112 and 114.

The source and drain electrodes 112 and 114, and the data line 116 may be formed by depositing a metal such as Al, Cu, Ni, Cr, Ti, Pt, Ta, Ti alloy, Mo or Mo alloy on the first substrate 100 and patterning the deposited material in a mask process.

The passivation layer 118 is formed on the first substrate 100 having the source and drain electrodes 112 and 114.

Figure 2B:
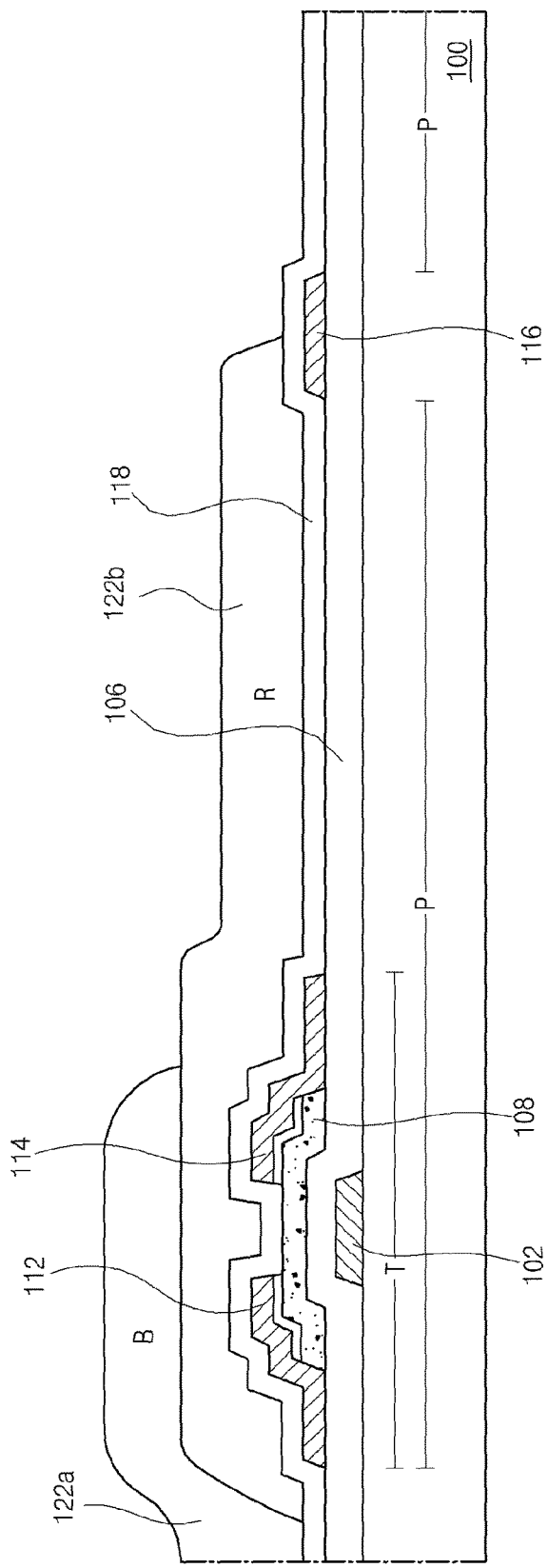

Referring to FIG. 2B, the blue, red and green color filters 122a, 122b and 122c are then formed.

The blue, red and green color filters 122a, 122b and 122c are formed in the respective mask processes. The blue, red and green color filters 122a, 122b and 122c each have a thickness of about 3 μm or less. For example, the thickness of each of the blue, red and green color filters 122a, 122b and 122c is about 2.3 μm.

At least two color filters, for example, the blue and red color filters 122a and 122b overlap each other on the TFT T, and the upper color filter of the at least two color filters, for example, the blue color filter 122a extending over the TFT T of the neighboring pixel region P has about 2 μm or less, for example, about 1.4 μm.

Although not shown in the drawings, one of the blue, red and green color filters 122a, 122b and 122c overlaps the other one of the blue, red and green color filters 122a, 122b and 122c on the TFT T of the neighboring pixel region P.

Figure 2C:
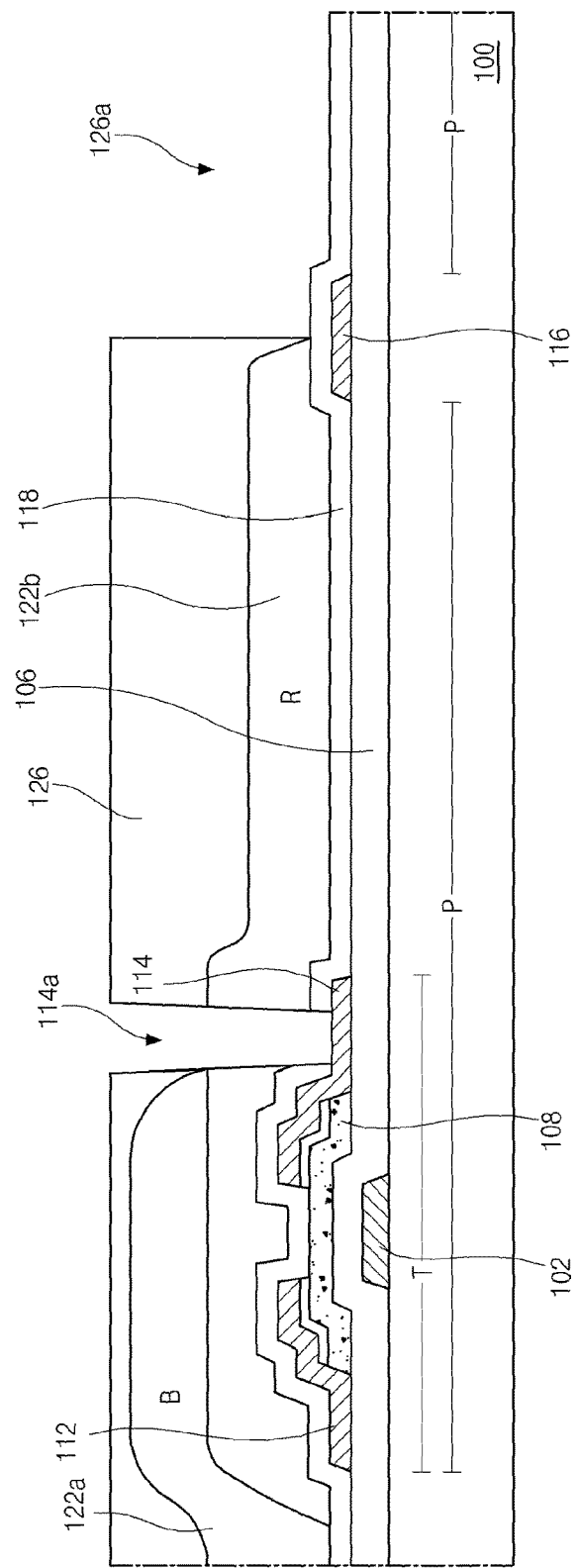

Referring to FIG. 2C, the planarization layer 126 is then formed on the blue, red and green color filters 122a, 122b and 122c.

The planarization layer 126 and the passivation layer 118 are patterned in a mask process to form a drain contact hole 114a exposing the drain electrode 114, and to form a white pattern hole 126a in the white pixel region. The white pattern hole 126a in the white pixel region is later filled with the white pattern 124.

Figure 2D:
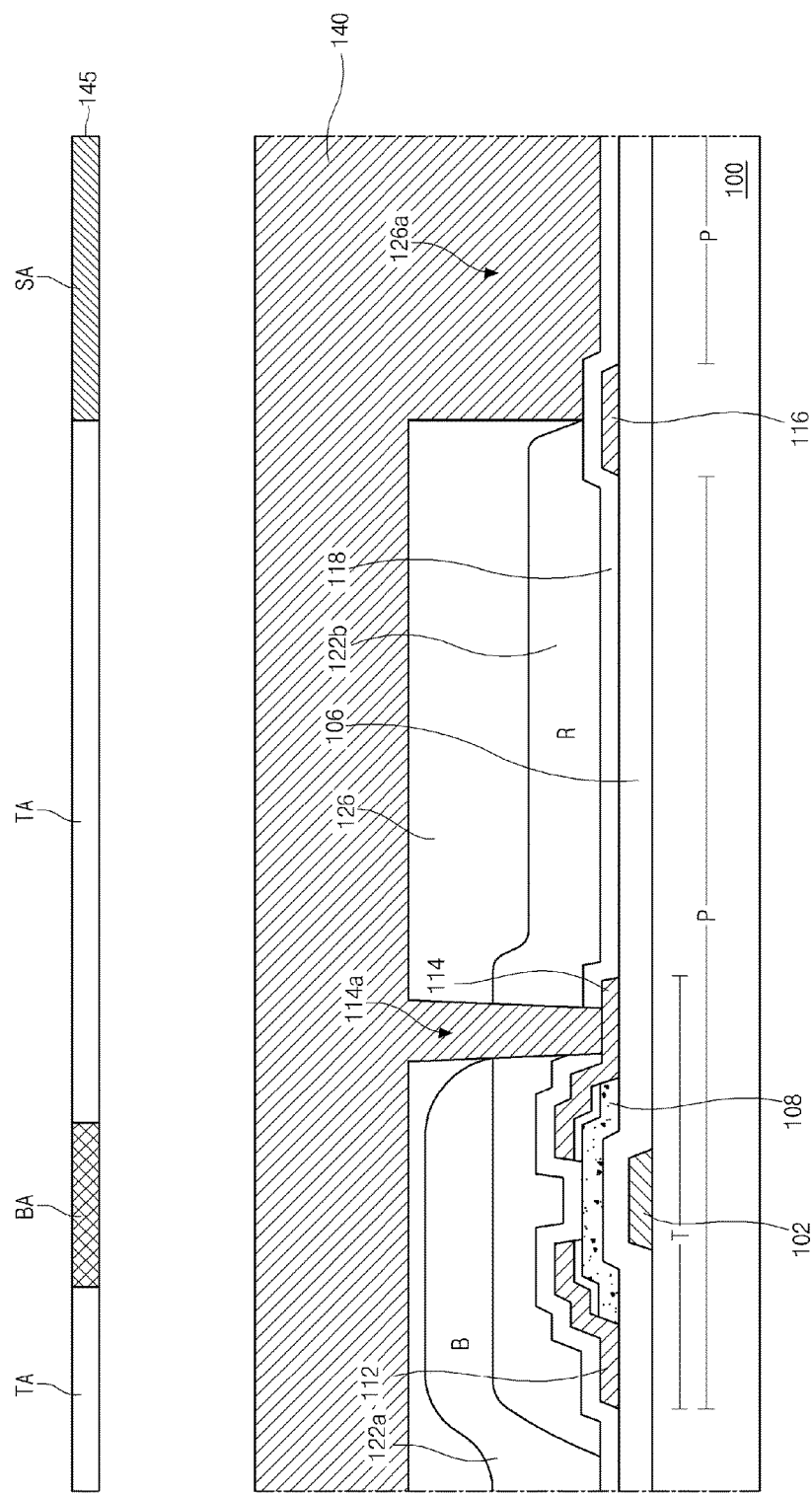

Referring to FIG. 2D, an organic material, for example, an acryl resin is then coated on the first substrate 100 having the planarization layer 126.

In this case, the organic material 140 is in a liquid state so that it flows from a higher level to a lower level. Accordingly, the organic material 140 is coated all over the first substrate 100 filling the drain contact hole 114a and the white pattern hole 126a.

The organic material 140 is photosensitive. Accordingly, a photo mask 145 is positioned over the first substrate 100, and then a light exposure process and a developing process for the organic material 140 are conducted. The photo mask 145 includes a transmissive portion TA, a semi-transmissive portion SA, and a blocking portion BA. The transmissve portion TA corresponds to the blue, red and green pixel regions, the semi-transmissive portion SA corresponds to the white pattern hole 126a, and the blocking portion corresponds to the TFT T.

Figure 2E:
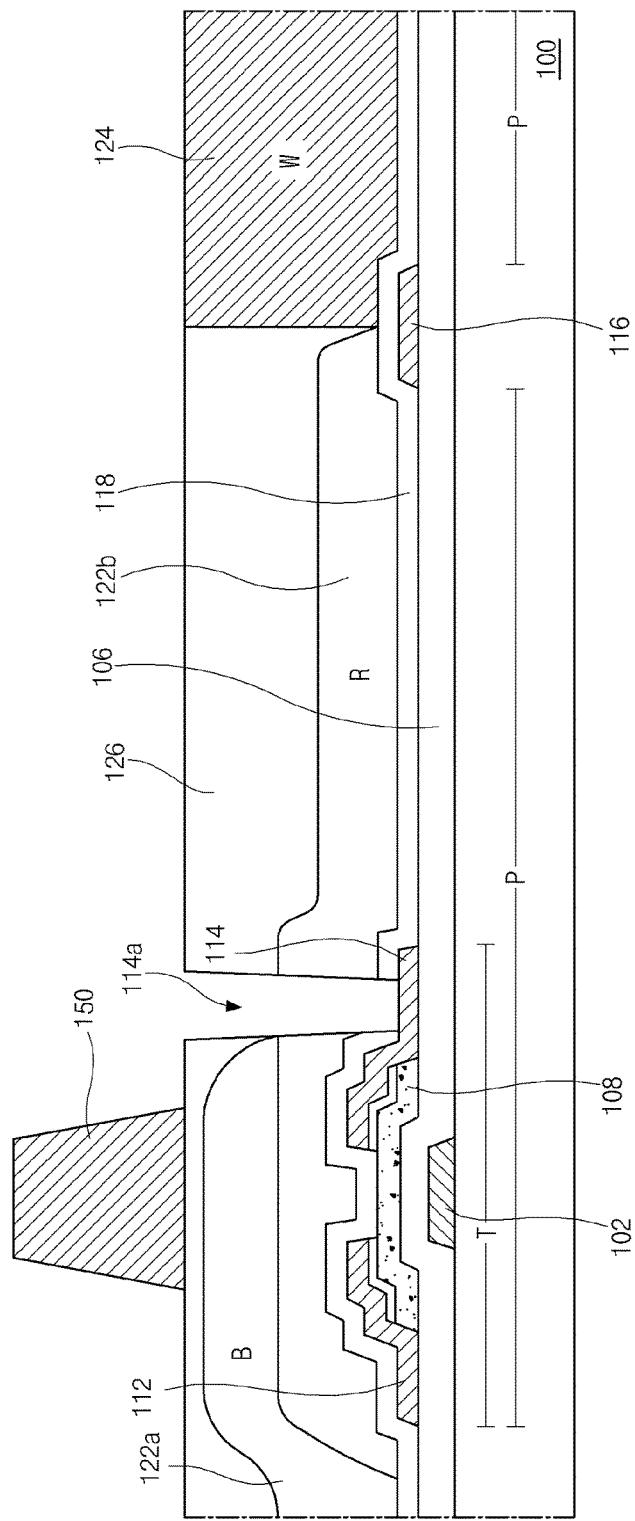

Referring to FIG. 2E, the organic material 140 is then patterned to form the column spacer 150 and the white pattern 124 simultaneously. The column spacer 150 is formed over the TFT T, and the white pattern 124 is formed in the white pattern hole 126a.

The column spacer 150 has a thickness of about 3 μm or less, for example, about 2.4 μm. The white pattern 124 has a thickness of about 4 μm or less, for example, 3.7 μm.

Because the column spacer 150 and the white pattern 124 are formed in the same mask process, a number of mask processes can be reduced, and thus productivity can be improved.

Figure 2F:
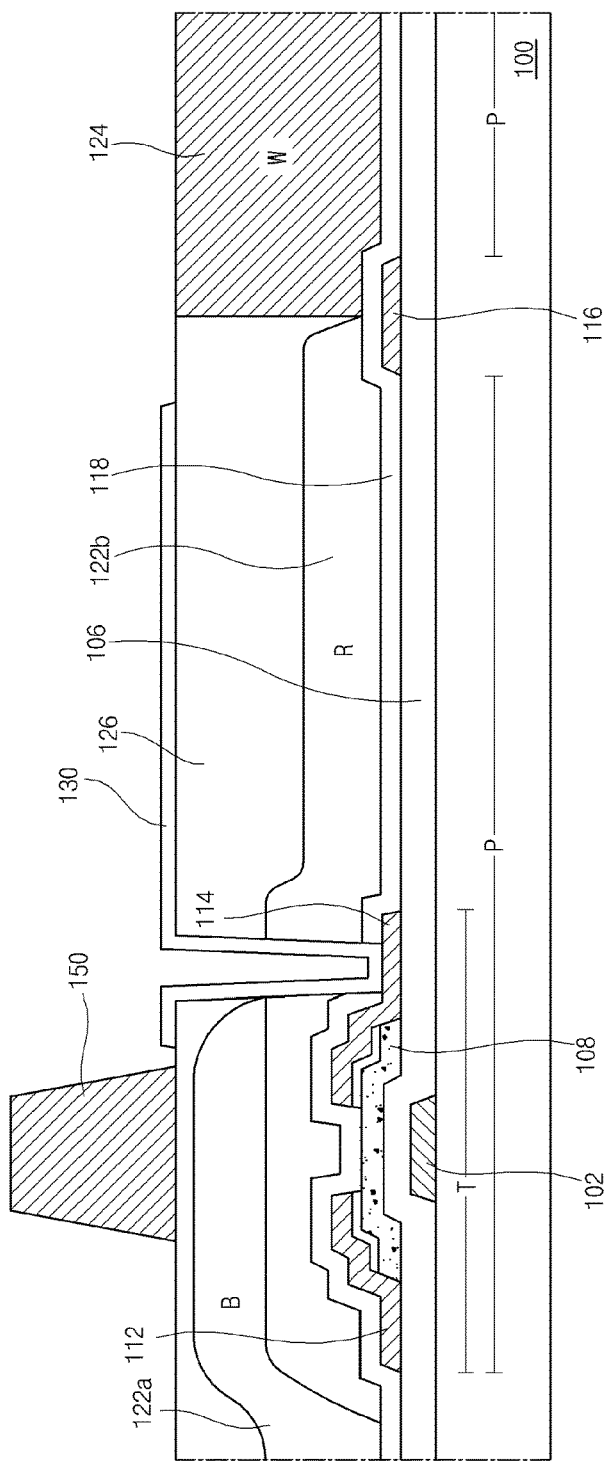

Referring to FIG. 2F, the pixel electrode 130 is formed in each pixel region P and on the planarization layer 126 and the white pattern 124. The pixel electrode 130 is electrically connected to the drain electrode 114 through the drain contact hole 114a.

Figure 2G:
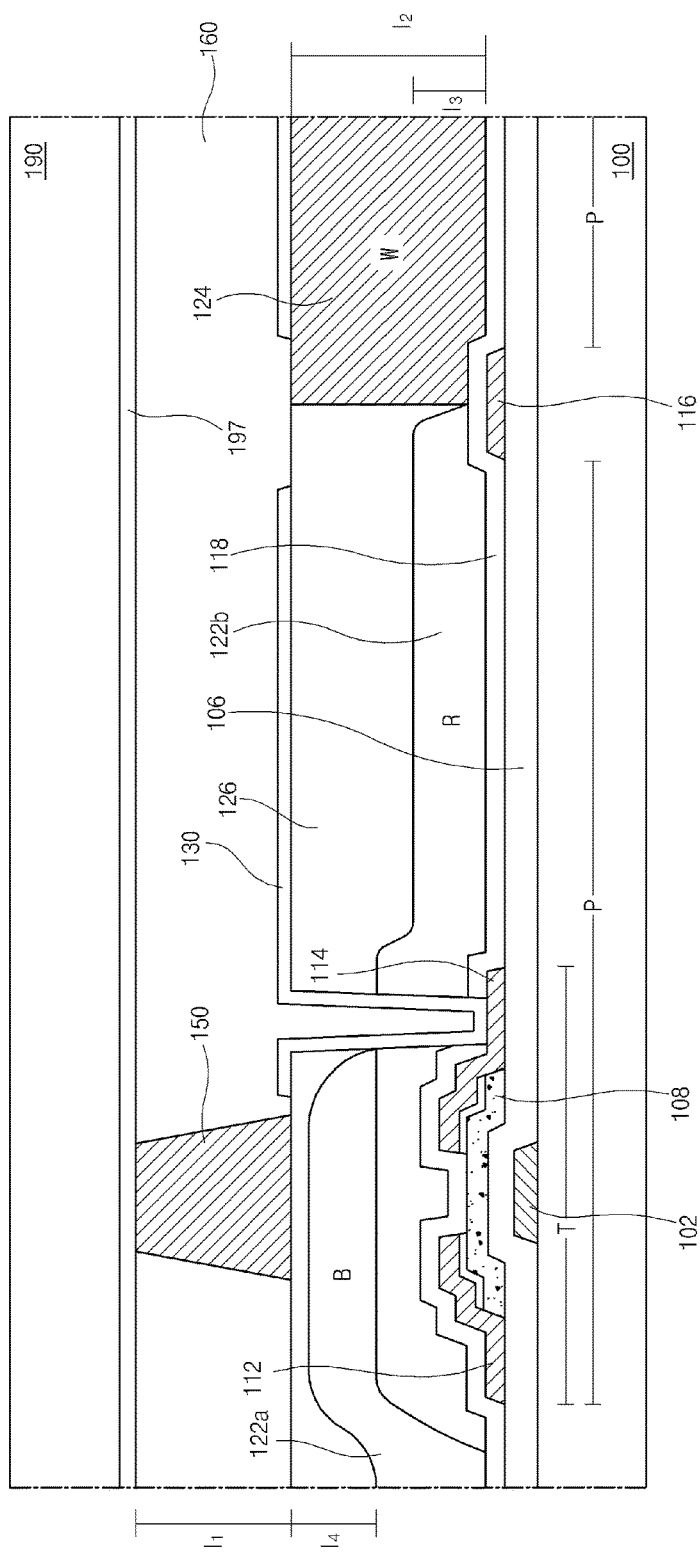

Referring to FIG. 2G, the second substrate 190 having a common electrode 197 thereon is then attached to the first substrate 100.

The liquid crystal layer 160 is provided between the first and second substrates 100 and 190.

Through the above-described processes, the COT-type LCD is manufactured.

In the above COT-type LCD, at least two of the blue, red and green color filters 122a, 122b and 122c are stacked and overlap each other on the TFT T, and thus functions as a black matrix to shield the semiconductor layer from light.

Further, the column spacer 150 and the white pattern 124 are formed in the same mask process. Accordingly, a number of mask processes can be reduced, and thus production cost can be reduced and productivity can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A color filter on transistor (COT) type liquid crystal display device, comprising:
    red, green, blue and white pixels on a substrate;
    red, green and blue color filters in the red, green and blue pixels, respectively, and a white pattern in the white pixel, wherein at least two of the red, green and blue color filters are stacked together in a black matrix region to serve as a black matrix and to cover and shield from light a portion of a semiconductor layer located between source and drain electrodes of a thin film transistor in one of the red, green and blue pixels;
    a pixel electrode that is on the white pattern in the white pixel and is connected to the drain electrode through a drain contact hole in the white pixel;
    a planarization layer on the red, green and blue color filters; and
    a column spacer on the planarization layer in a region where the at least two of the red, green and blue color filters are stacked together to cover the semiconductor layer between the source and drain electrodes, and
    wherein the column spacer and the white pattern are made of a same transparent material, and a thickness of the white pattern is substantially equal to a total thickness of: (1) the planarization layer and the red, green or blue color filter in the respective red, green or blue pixel, and (2) the planarization layer and the at least two of the red, green and blue color filters stacked together in the black matrix region,
    wherein the white pattern and the planarization layer are distinct layers,
    wherein the column spacer has a first thickness and the white pattern has a second thickness greater than the first thickness, and
    wherein the pixel electrode contacts a side surface, located at a side of the drain contact hole, of the white pattern, and contacts a side surface, located at an opposing side of the drain contact hole, of one of the red, green and blue color filters that neighbors with the white pattern and extends into the white pixel.

2. The device of claim 1, wherein the column spacer has a first thickness of about 3 μm or less, and the white pattern has a second thickness of about 4 μm or less.

3. The device of claim 1, wherein each of the red, green and blue color filters has a third thickness of about 3 μm or less, and wherein an upper layer of the at least two of the red, green and blue color filters has a fourth thickness of about 2 μm or less.

4. The device of claim 1, wherein the column spacer and the white pattern are made of an organic material.

5. The device of claim 1, wherein a top surface of the planarization layer on each of the red, green and blue color filters is substantially equal to that of the planarization layer in an overlap region where the at least two of the red, green and blue color filters are stacked together to cover the semiconductor layer between the source and drain electrodes.

6. The device of claim 1, wherein the at least two of the red, green and blue color filters stacked together in the black matrix region to serve as a black matrix comprise end portions of the at least two of the red, green and blue color filters.

7. A method of manufacturing a color filter on transistor (COT) type liquid crystal display device, comprising:
    forming a thin film transistor on a first substrate, the thin film transistor including a gate electrode, an active layer and source and drain electrodes;
    forming a passivation layer on the thin film transistor;
    forming red, green and blue color filters on the passivation layer in respective pixel regions, wherein at least two of the red, green and blue color filters are stacked together in a black matrix region to serve as a black matrix and to cover and shield from light a portion of the active layer located between the source and drain electrodes;

forming a planarization layer on the red, green and blue color filters so that a top surface of the planarization layer on each of the red, green and blue color filters is substantially equal to that of the planarization layer in an overlap region where the at least two of the red, green and blue color filters are stacked together to cover the semiconductor layer between the source and drain electrodes;

forming a white pattern hole in the planarization layer;

forming a transparent organic material over the substrate having the planarization layer including the white pattern hole;

forming a column spacer in the overlap region and a white pattern by patterning the transparent organic material using a blocking portion of a mask and a semi-transmissive portion of the mask for the column spacer and the white pattern, respectively, wherein a thickness of the white pattern is substantially equal to a total thickness of: (1) the planarization layer and the red, green or blue color filter in the respective red, green or blue pixel, and (2) the planarization layer and the at least two of the red, green and blue color filters stacked together in the black matrix region; and forming a pixel electrode electrically connected to the drain electrode, wherein the white pattern and the planarization layer are distinct layers, wherein the pixel electrode on the white pattern in the white pixel is connected to the drain electrode through a drain contact hole in the white pixel, wherein the pixel electrode in the white pixel contacts a side surface, located at a side of the drain contact hole, of the white pattern, and contacts a side surface, located at an opposing side of the drain contact hole, of one of the red, green and blue color filters that neighbors with the white pattern and extends into the white pixel.

8. The method of claim 7, wherein the column spacer has a first thickness and the white pattern has a second thickness greater than the first thickness.

9. The method of claim 8, wherein the first thickness is about 3 μm or less, and the second thickness is about 4 μm or less.

10. The method of claim 7, wherein each of the red, green and blue color filters has a third thickness of about 3 μm or less.

11. The method of claim 7, wherein the organic material is photosensitive, and the column spacer and the white pattern are simultaneously formed by irradiating a light onto the organic material.

12. The method of claim 7, wherein the at least two of the red, green and blue color filters stacked together in the black matrix region to serve as a black matrix comprise end portions of the at least two of the red, green and blue color filters.

\* \* \* \* \*